United States Patent [19]

Cessna

[11] Patent Number: 5,089,327
[45] Date of Patent: Feb. 18, 1992

[54] ANTI-STATIC SHEET FOR USE IN HIGH PRESSURE LAMINATES

[75] Inventor: Frank L. Cessna, Middletown, Ohio

[73] Assignee: The Sorg Paper Company, Middletown, Ohio

[21] Appl. No.: 333,093

[22] Filed: Apr. 4, 1989

Related U.S. Application Data

[63] Continuation-in-part of Ser. No. 50,076, May 15, 1987, abandoned.

[51] Int. Cl.$^5$ .................. B32B 27/04; B32B 27/18; B32B 29/06
[52] U.S. Cl. .................. 428/288; 428/290; 428/409; 428/537.5; 428/922; 252/500
[58] Field of Search ............ 428/922, 409, 328, 326, 428/537.5, 288, 290; 252/500

[56] References Cited

U.S. PATENT DOCUMENTS

| | | | |
|---|---|---|---|
| 3,991,256 | 11/1976 | Cornier | 428/514 |
| 4,454,199 | 6/1984 | Berbeco | 428/322.2 |
| 4,480,001 | 10/1984 | Cannady | 428/284 |
| 4,569,888 | 2/1986 | Muller | 428/481 |
| 4,662,514 | 5/1987 | Berbeco | 428/922 |

FOREIGN PATENT DOCUMENTS 6034733  8/1979  Japan.

*Primary Examiner*—Jenna Davis
*Attorney, Agent, or Firm*—Frost & Jacobs

[57] ABSTRACT

An anti-static paper sheet for use in high pressure laminates comprised of Pontiac hardwood, high alpha hardwood, and cotton linters, the sheet being initially treated with a wet strength resin and saturated with a water soluble polycationic quaternary ammonium polymer which is free from metallic salts in an amount of at least about one pound of polymer to 1000 square feet of sheet material having a basis weight of about 75 pounds per ream, the anti-static polymer being applied at a temperature of from about 135° F. to about 155° F.

5 Claims, No Drawings

ANTI-STATIC SHEET FOR USE IN HIGH PRESSURE LAMINATES

This is a continuation-in-part of U.S. application Ser. No. 07/050,076, now abandoned, filed May 15, 1987.

This invention relates to high pressure laminates of the type utilized in the manufacture of office furniture, such as word processor work stations, and has to do more particularly with the provision of a laminating sheet having exceptional anti-static properties.

BACKGROUND OF THE INVENTION

The problem of static electricity has become an ever increasing problem in environments where electronic equipment, such as computers and word processors, are in use. Basically, static is created when two similar materials are rubbed together and then separated. One object tends to give up electrons whereas the other tends to accumulate them, thereby leaving the former with a positive static charge and the latter with a negative charge. When oppositely charged objects contact each other, a static shock is created which corrects the imbalance.

Since the human body is almost a perfect conductor of electricity, studies of human movement in the office have shown that voltages in the range of 10,000 volts and higher can be generated. When discharged, these voltages can cause serious electrostatic damage to electronic components. A simple example of electrostatic discharge involves a person walking across a dry carpet in a dry atmosphere and touching a metallic object. The charge built up by the person moving across the carpet is retained throughout the person's body. As the person's hand reaches for the object a short distance away, the air's breakdown voltage is exceeded and an instantaneous blue arc occurs between the hand and the object. Interestingly, if breakdown voltage is not achieved (the charge generated is relatively small), the person will still discharge when touching the object. Particularly important is the fact that the person will not sense a discharge of less than 3500 volts. If this same person were reaching for an electronic component, such as a board or device on a grounded conductive table top, the discharge would occur through the component. Since many components and devices are sensitive to potentials far less than 3500 volts, the component could be damaged, and the person involved would have no way of knowing the cause.

Materials differ in their abilities to create and hold static charges, and over the years various expedients have been employed to provide anti-static properties. For example, substantial work has been done in the field of textiles, and also in other fields, including high pressure laminates and various types of cellulosic and non-cellulosic soft goods. Basically, these efforts have been directed to the use of additives such as metallic salts and carbon fibers. However, as applied to the decorative field, i.e., high pressure laminates, considerable difficulty has been experienced due to bleeding or blooming of the anti-static materials, particularly in the top or surface sheet of the laminate, thereby interfering with the coloring and/or decorative effects created on the top sheet. This is particularly true where the anti-static material contains a metallic salt. It has been found that where metallic salts are used, the anti-static properties of the laminate decrease in proportion to decreases in relative humidity, with the result that a laminate possessing the desired resistivity (ohms/square) at a relative humidity of 45–50% will be totally unsatisfactory at a lower relative humidity, as for example, below 35%. As a result, there has been no adequate solution to the problem of providing effective anti-static properties in resinous laminates.

Various anti-static chemical additives have been utilized for paper and for cellulosic and non-cellulosic non-woven disposable soft goods to minimize the discharge of static electricity, as encountered in high-speed printing and converting operations and also in the use of disposable soft goods, such as tissues. A product particularly suited for this purpose is LECTRAPEL ® which is a water soluble polycationic quaternary ammonium polymer manufactured by Calgon Corporation. Applications of 0.0025 to 0.01 pound solids per 1000 square feet of paper, paperboard or non-woven textile fabric are the normal range in which this material is applied to the sheet being treated. Higher concentrations have not been recommended due to puddling of the material and the anticipated adverse effect on the ability of the treated sheet to be saturated with resin or other desired saturants. Consequently, materials such as LECTRAPEL ® have hitherto been regarded as unsuitable for use in high pressure laminates.

SUMMARY OF THE INVENTION

Contrary to the accepted understanding in the industry, it has now been found that water soluble polycationic quaternary ammonium polymer, such as LECTRAPEL*, which is free from metallic salts, can be effectively incorporated in the top sheet of a high pressure laminate to provide effective anti-static properties over a wide range of relative humidities if certain conditions are observed.

Paramount among these conditions is the nature of the sheet being treated, it being essential that the sheet be open and porous since, contrary to prior applications utilizing anti-static chemical additives, it has been found desirable to introduce as much of the chemical additive into the sheet as possible. Preferably, the sheet is composed of Pontiac hardwood, high alpha hardwood and cotton linters, each of which contributes to the effectiveness of the sheet for laminating purposes as well as retention of the anti-static polymer.

Contrary to prior uses of the chemical additive, it is applied to the sheet in massive amounts, preferably in the range of 154 gallons per hour by a one side treatment through a sizing press. This equates to an application of about 1.067 pounds of polymer per 1000 square feet of paper, which is approximately 100 times the quantity heretofore utilized in paper and board applications.

In order to effect the desired pickup, it is necessary to control the temperature of the polymer as it is being applied since, at the desired level of application, it has a tendency to gel and harden.

It is also necessary to add a wet strength resin, such as melamine-formaldehyde, to the paper stock at the wet end of the paper making machine to ensure that the sheet will have sufficient wet strength to go through the sizing press and receive the anti-static polymer.

Sheets treated in accordance with the invention have been found to have a resistivity (ohms/square) of from $10^7$ to $10^8$, which is well within industry standards for effective anti-static properties. Moreover, sheets in accordance with the invention have been found to achieve substantially uniform surface conductivity as well as volume conductivity, thereby providing a highly stable sheet having uniform conductivity throughout.

DESCRIPTION OF THE PREFERRED EMBODIMENTS

A laminating sheet in accordance with the present invention preferably will comprise a 75 lb. sheet ($24 \times 36 \times 500$) which is free from sizing. The fibre makeup of the sheet is as follows:

| | |
|---|---|
| 47%-53% | Pontiac hardwood, with a standard of 50% |
| 37%-39% | high alpha hardwood, with a standard of 38% |
| 8%-16% | cotton linters, with a standard of 12% |

The furnish is treated at the wet end of the paper making machine with a wet strength resin to ensure that the sheet will retain its integrity during application of the anti-static polymer. Since melamine-formaldehyde is a widely used laminating resin, it may be used to provide the desired wet strength. Other types of wet strength resins, such as urea-formaldehyde, may be used, as may neutral cure resins, such as kymene resin. Excellent results are achieved by adding 2% resin to the furnish on a dry weight basis, i.e., 2 pounds resin to 100 pounds of dry fibers. As will be understood by the worker in the art, melamine-formaldehyde, which is the preferred wet strength resin, requires acid to act as a catalyst so that the melamine-formaldehyde will become an efficient wet strength agent. In other words, to gain sufficient wet strength for the sheet to go through the sizing press and accept large amounts of liquid, an acid, preferably alum, must be added to the wet end of the paper making machine to give the melamine-formaldehyde resin its optimum wet strength characteristics.

The sheet so formed is fed into a conventional sizing press where it is treated with the anti-static polymer, which is a water soluble polycationic quaternary ammonium polymer, known as LECTRAPEL ® manufactured by Calgon Corporation. This material is mixed in a ratio of 1.5 gallons of polymer to 4.5 gallons of water in a tub solution, giving a fractometer reading of 14° brix.

The solution may be applied to the sheet on a conventional sizing press utilizing a one or two side treatment, with the sheet preferably running at 450 feet per minute. In order to optimize penetration, the solution is applied at a temperature of from 135° F. to 155° F., preferably at 140° F., at which temperature optimum penetration is achieved, the pickup preferably being 154 gallons per hour which equates to 4.2% solids being retained in the sheet. Preferably the pH of the paper will be maintained at 5.5 for optimum penetration of the laminating resin, except where neutral cure resins are utilized to provide the desired wet strength, in which event pH will be in the range of 7-7.2. In operating the size press, care must be taken to carefully adjust the solution flow to ensure uniform application of the solution.

When treated in the manner described, the sheet has a resistivity (ohms/square) of $10^7$ to $10^8$, which is highly desirable for anti-static properties, and possesses substantially uniform resistivity throughout its thickness and on its exposed surfaces. When utilized in a high pressure laminate, it has been found that the anti-static polymer will not migrate, yet the sheet may be saturated with melamine-formaldehyde or other laminating resins without losing its anti-static properties or its color, irrespective of whether it is a solid color or a decorative motif. In addition, The resistivity of the sheet remains substantially constant at relative humidities well below the 35% level.

What is claimed is:

1. An anti-static laminating sheet having a resistivity ohms/square after "$10^8$" of $10^8$ or less, said sheet consisting essentially of:
   47%-53% Pontiac hardwood
   37%-39% high alpha hardwood
   8%-16% cotton linters
said sheet being saturated with a water soluble polycationic quaternary ammonium polymer which is free from metallic salts, said sheet also containing a wet strength resin in a quantity sufficient to maintain the integrity of the sheet during saturation with said polymer, said polymer being present in a quantity of at least about one pound of polymer per 1000 square feet of sheet material having a basis weight of about 75 pounds per ream.

2. The anti-static laminating sheet claimed in claim 1 wherein said sheet comprises 50% Pontiac hardwood, 38% high alpha hardwood, and 10% cotton linters.

3. The anti-static laminating sheet claimed in either of claims 1 or 2 wherein said wet strength resin is present in a quantity of about 2 pounds of resin to 100 pounds of dry fibers.

4. The anti-static laminating sheet claimed in claim 3 wherein said wet strength resin comprises melamine-formaldehyde, said sheet having a pH of about 5.5.

5. An anti-static laminating sheet consisting essentially of:
   47%-53% Pontiac hardwood
   37%-39% high alpha hardwood
   8%-16% cotton linters
said sheet containing a wet strength resin in a sufficiently small quantity such that said sheet is impregnated with a water soluble polycationic quaternary ammonium polymer which is free from metallic salts, said polymer being present in a quantity sufficient to produce a resistivity of from $10^7$–$10^8$ ohms/square at relative humidities of from 5% to 50%.

* * * * *

UNITED STATES PATENT AND TRADEMARK OFFICE
CERTIFICATE OF CORRECTION

PATENT NO. : 5,089,327
DATED : February 18, 1992
INVENTOR(S) : Frank L. Cessna

It is certified that error appears in the above—identified patent and that said Letters Patent is hereby corrected as shown below:

Column 4 - Claim 1 - Line 20 - "ohms/square after "$10^8$" of $10^8$" should be deleted and replaced with --of $10^8$ ohms/square--.

Signed and Sealed this

Twenty-fifth Day of May, 1993

Attest:

MICHAEL K. KIRK

Attesting Officer

Acting Commissioner of Patents and Trademarks